(12) United States Patent
Parihar et al.

(10) Patent No.: US 8,493,346 B2
(45) Date of Patent: Jul. 23, 2013

(54) MORPHING TOUCHSCREEN KEYBOARD INTERFACE

(75) Inventors: Yuvi Parihar, Ballsbridge (IE); Josef Scherpa, Fort Collins, CO (US); Tim P. Winkler, Southbury, CT (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 12/651,319

(22) Filed: Dec. 31, 2009

(65) Prior Publication Data

US 2011/0157090 A1    Jun. 30, 2011

(51) Int. Cl.
*G09G 5/00* (2006.01)

(52) U.S. Cl.
USPC ............................ 345/173; 345/157; 345/174

(58) Field of Classification Search
USPC .......................................... 345/157, 173, 174
See application file for complete search history.

(56) References Cited

U.S. PATENT DOCUMENTS

| | | | |
|---|---|---|---|
| 5,128,672 A | 7/1992 | Kaehler | |
| 5,376,946 A * | 12/1994 | Mikan | 345/157 |
| 5,565,894 A | 10/1996 | Bates et al. | |
| 5,748,512 A | 5/1998 | Vargas | |
| 7,292,151 B2 * | 11/2007 | Ferguson et al. | 340/573.1 |
| 2006/0238520 A1 * | 10/2006 | Westerman et al. | 345/173 |
| 2007/0052690 A1 * | 3/2007 | Roberts | 345/173 |
| 2008/0088592 A1 * | 4/2008 | Fry | 345/173 |
| 2008/0209442 A1 | 8/2008 | Setlur et al. | |
| 2009/0106694 A1 | 4/2009 | Kraft et al. | |
| 2009/0284495 A1 * | 11/2009 | Geaghan et al. | 345/174 |

FOREIGN PATENT DOCUMENTS

| | | |
|---|---|---|
| EP | 1971117 A1 | 9/2008 |
| WO | 2009074210 A2 | 6/2009 |
| WO | 2009088972 A1 | 7/2009 |
| WO | 2009089222 A2 | 7/2009 |

OTHER PUBLICATIONS

Gantenbein, D; Soft Adaptive Follow-Finger Keyboard for Touch-Screen Pads; Nov. 1993; IBM; Technical Disclusure Bulletin vol. 36 No. 11; p. 5-7.*

Gantenbien, IBM Technical Disclosure Bulletin, vol. 36 No. 11 pp. 5-7, Nov. 1993.*

* cited by examiner

*Primary Examiner* — Quan-Zhen Wang
*Assistant Examiner* — Michael J Eurice
(74) *Attorney, Agent, or Firm* — Steven Greenberg, Esq.; Carey, Rodriguez, Greenberg & O'Keefe

(57) ABSTRACT

Embodiments of the present invention address deficiencies of the art in respect to touch interfaces and provide a novel and non-obvious method, system and computer program product for generating touch interface displays. In one embodiment of the invention, a computer-implemented method for generating touch interface displays at a communication device with a touch interface includes initiating a set of calibration exercises, providing a set of instructions to a user of the communication device, receiving calibration data at the touch interface, analyzing the received calibration data to determine if the calibration is complete, repeating said providing and receiving steps until the calibration is complete and generating a touch interface display based on the received calibration data. The computer-implemented method can further include receiving use data for each key touch of the touch interface, defining a set of averages over time for finger skin touch area, finger size data and finger position and automatically resizing, reshaping and repositioning at least one key of the touch interface display based on the defined set of averages.

14 Claims, 3 Drawing Sheets

MORPHING TOUCHSCREEN KEYBOARD INTERFACE

BACKGROUND OF THE INVENTION

1. Field of the Invention

The present invention relates to virtual or onscreen keyboards and more particularly to a virtual or onscreen touch interface that automatically adjusts to reshape and reposition keys for user optimization.

2. Description of the Related Art

For years the physical keyboard has been the standard for data entry in computer systems (and previously, typing devices). While most users are familiar with the QWERTY keyboard, other keyboard layouts have been created, such as the Dvorak keyboard in attempts to improve efficiency. However the QWERTY and Dvorak keyboards and other keyboards have fixed sets of physical keys, while users of these keyboards have a variety of anatomical hand sizes, finger sizes and ranges of motion. With the introduction of touch interfaces, e.g., screen and projection "surface computing" interfaces, there is no longer a need to construct or display static keys, as the keyboard and/or buttons can be displayed visually on the touch interface display and placed in any size, shape, or layout configuration desired.

In addition, as each person has a different physical anatomy in terms of finger size, length, range of motion, efficiency gains could be achieved in terms of speed, "comfort" and error prevention by adapting the keyboard to a user's unique typing motion paths.

BRIEF SUMMARY OF THE INVENTION

Embodiments of the present invention address deficiencies of the art in respect to touch interfaces and provide a novel and non-obvious method, system and computer program product for generating touch interface displays. In one embodiment of the invention, a computer-implemented method for generating touch interface displays at a communication device with a touch interface includes initiating a set of calibration exercises, providing a set of instructions to a user of the communication device, receiving calibration data at the touch interface, analyzing the received calibration data to determine if the calibration is complete, repeating said providing and receiving steps until the calibration is complete and generating a touch interface display based on the received calibration data.

In an aspect of this embodiment, the computer-implemented method can further include receiving use data for each key touch of the touch interface, defining a set of averages over time for finger skin touch area, finger size data and finger position and automatically resizing, reshaping and repositioning at least one key of the touch interface display based on the defined set of averages.

In yet another aspect of this embodiment, the computer-implemented method can further include creating an anatomic profile of a user from the received calibration data, the anatomic profile including finger size and range of motion information, comparing the anatomic profile of the user to a group average anatomic profile of other users having a similar individual anatomic profile; and, providing a starting template for an interface layout based on the comparison of the anatomic profile of the user to the group average anatomic profile of the other users having a similar individual anatomic profile.

In another embodiment of the invention, a communication device with a touch interface can be provided. The communication device with a touch interface can include a microprocessor, a touch interface display communicatively coupled to the microprocessor and a touch interface controller configured to control the touch interface display, the touch interface controller can include program code enabled to receive calibration data at the touch interface, to analyze the received calibration data, to determine if the calibration is complete and generate a touch interface display based on the received calibration data. In another aspect of this embodiment, the program code further can be enabled to receive use data for each key touch of the touch interface, to define a set of averages over time for finger skin touch area, finger size data and finger position and to automatically resize, reshape and reposition at least one key of the touch interface display based on the defined set of averages.

Additional aspects of the invention will be set forth in part in the description that follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention address deficiencies of the art in respect to touch interfaces and provide a novel and non-obvious method, system and computer program product for generating touch interface displays. In one embodiment of the invention, a computer-implemented method for generating touch interface displays at a communication device with a touch interface includes initiating a set of calibration exercises, providing a set of instructions to a user of the communication device, receiving calibration data at the touch interface, analyzing the received calibration data to determine if the calibration is complete, repeating said providing and receiving steps until the calibration is complete and generating a touch interface display based on the received calibration data.

In an aspect of this embodiment, the computer-implemented method can further include receiving use data for each key touch of the touch interface, defining a set of averages over time for finger skin touch area, finger size data and finger position and automatically resizing, reshaping and repositioning at least one key of the touch interface display based on the defined set of averages. In yet another aspect of this embodiment, the computer-implemented method can further include creating an anatomic profile of a user from the received calibration data, the anatomic profile including finger size and range of motion information, comparing the anatomic profile of the user to a group average anatomic profile of other users having a similar individual anatomic profile; and, providing a starting template for an interface layout based on the comparison of the anatomic profile of the user to the group average anatomic profile of the other users having a similar individual anatomic profile.

In another embodiment of the invention, a communication device with a touch interface can be provided. The communication device with a touch interface can include a microprocessor, a touch interface display communicatively coupled to the microprocessor and a touch interface controller configured to control the touch interface display, the touch interface controller can include program code enabled to receive calibration data at the touch interface, to analyze the received calibration data, to determine if the calibration is complete and generate a touch interface display based on the received calibration data. In another aspect of this embodiment, the program code further can be enabled to receive use data for each key touch of the touch interface, to define a set of averages over time for finger skin touch area, finger size data and finger position and to automatically resize, reshape and reposition at least one key of the touch interface display based on the defined set of averages.

Figure 1:
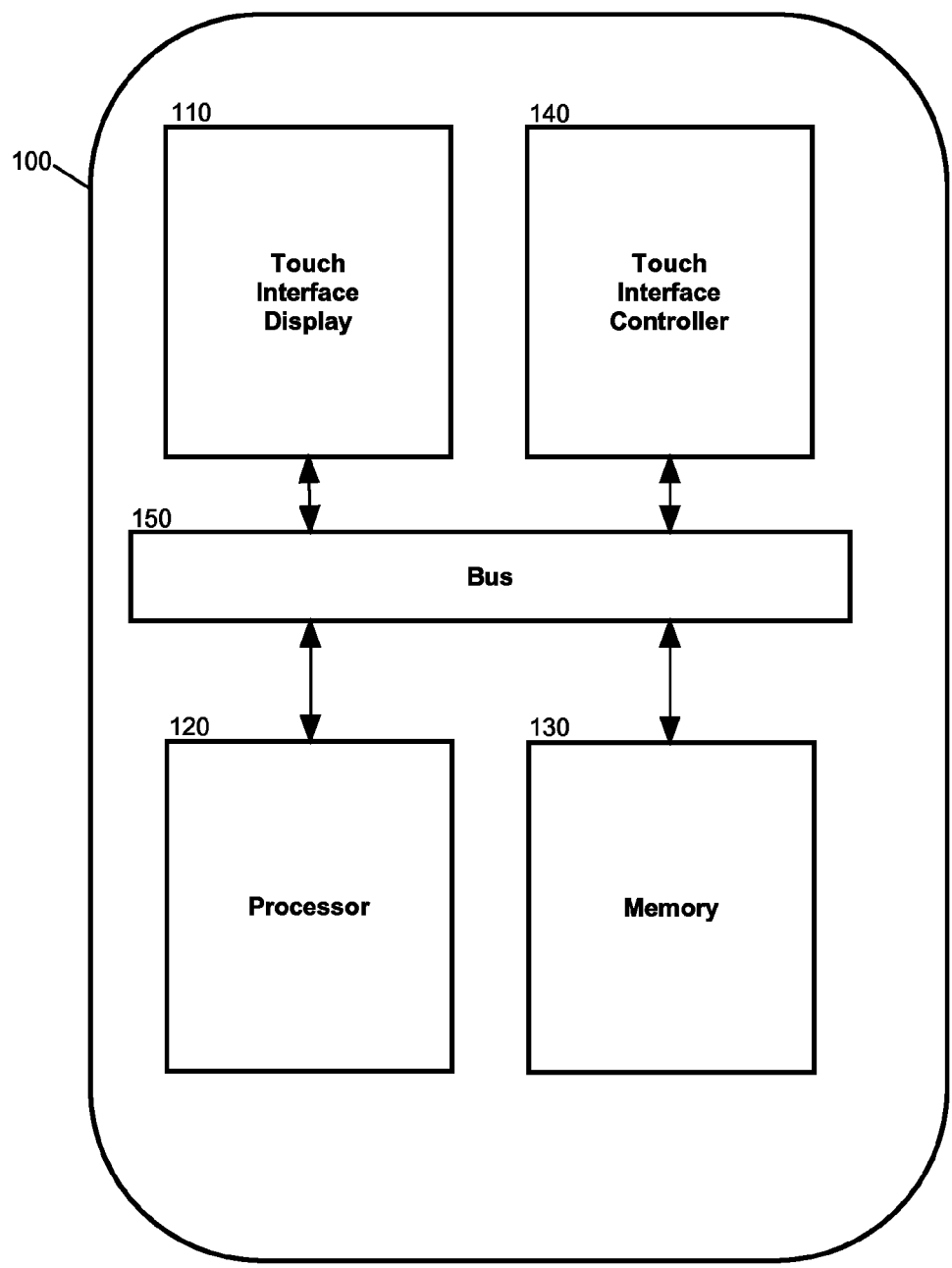
FIG. 1 is a schematic illustration of a communication device for generating a touch interface display screen.

In further illustration, FIG. 1 is a schematic illustration of a communication device for generating a touch interface display screen. The communication device 100 can be a portable multifunction device such as a portable communications device, e.g., a mobile telephone, a PDA, a tablet computer, music player and the like. The communication device 100 can include a touch interface display 110 (e.g., a touchscreen display or a projection surface computing display) communicatively coupled to a bus 150. The communication device 100 further can include a microprocessor 120 and a memory store 130 coupled to the bus 150. The microprocessor 120 can support operation of a communication device 100 and access memory store 130 for any required operating system capabilities as well as any data or applications necessary for communication device 100 operation. Microprocessor 120 further can support the operation of one or more user applications (not shown), for example a word processor, spreadsheet, database application, Web browser and the like. In accordance with an embodiment of the invention, the communication device 100 can include a touch interface controller 140 for initiating and controlling the touch interface display 110.

Notably, microprocessor 120 can be communicatively coupled to the touch interface controller 140. The touch interface controller 140 can include program code enabled to initiate a set of calibration exercises, provide a set of instructions to a user of the communication device 100, receive calibration data at the touch interface 110, analyze the received calibration data to determine if the calibration is complete and generate a touch interface display based on the received calibration data. The touch interface controller 140 further can include program code enabled to detect a range of discrepancy in the center of the surface area for each key touch in a set of key touches. After calibration of the touch interface, the touch interface controller 140 further can include program code enabled to receive use data for each key touch of the touch interface, define a set of averages over time for finger skin touch area, finger size data and finger position, and to automatically resize, reshape and reposition at least one key of the touch interface display 110 based on the defined set of averages.

Figure 2:
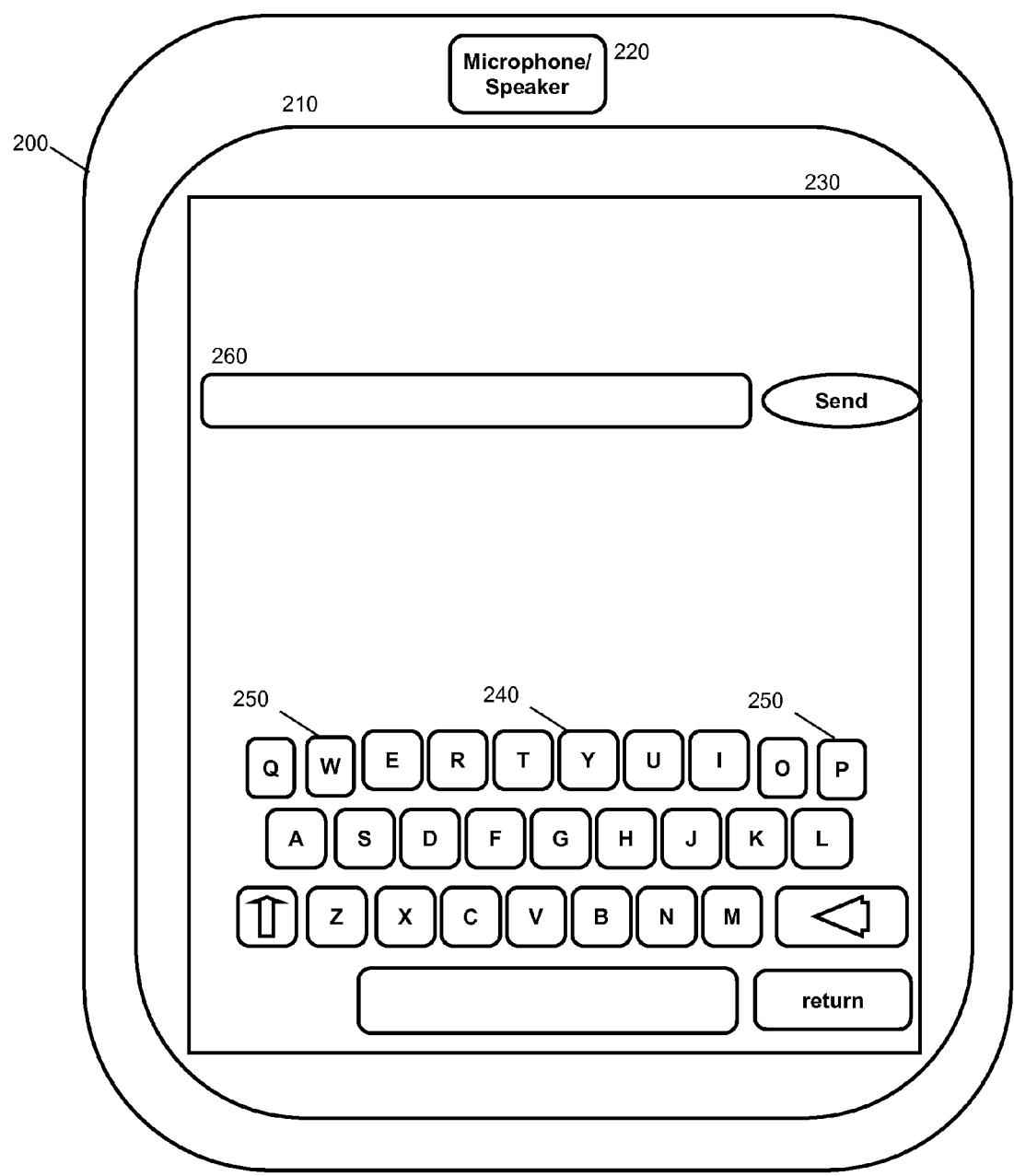
FIG. 2 is a schematic illustration of generated touch interface display screen according to one embodiment of the invention; and, FIG. 3 is a flow chart illustrating a process for generating a touch interface display.

In further illustration, FIG. 2 is a schematic illustration of generated touch interface display screen according to one embodiment of the invention. As illustrated, communication device 200 can include a touch interface display 210, a microphone/speaker 220 coupled to the casing of communication device 200 and a generated touch interface display configuration 230, e.g., shown as a visual keyboard display. In embodiments, the generated touch interface display configuration 230 can be phone dialer interface, for example a conventional 3×3×1 configuration, a unique dial pad interface, e.g., a circular dial pad configuration similar to a rotary dial telephone, or a linear line dial pad, e.g., a 1×10 row of numbers with a slight curvature or arc similar to a rainbow that better matches the range of motion that occurs when a user is dialing numbers with a single finger, such as a thumb. As illustrated in FIG. 2, some of the keys are standard size and standard position keys 240, while other keys are adjusted size and adjusted position keys 250. In this embodiment, the "Q" and "W" keys 250 have reduced key width size and both keys have had their positions adjusted to be closer to the row of keys below them. Greater repositioning of keys 250 is contemplated by this invention including a complete re-sequencing of any of the keys in the visual keyboard display configuration 230. In embodiments, the touch interface display 210 also can include a display element that shows the key inputs a user has entered, such as a web browser address bar 260.

Figure 3:
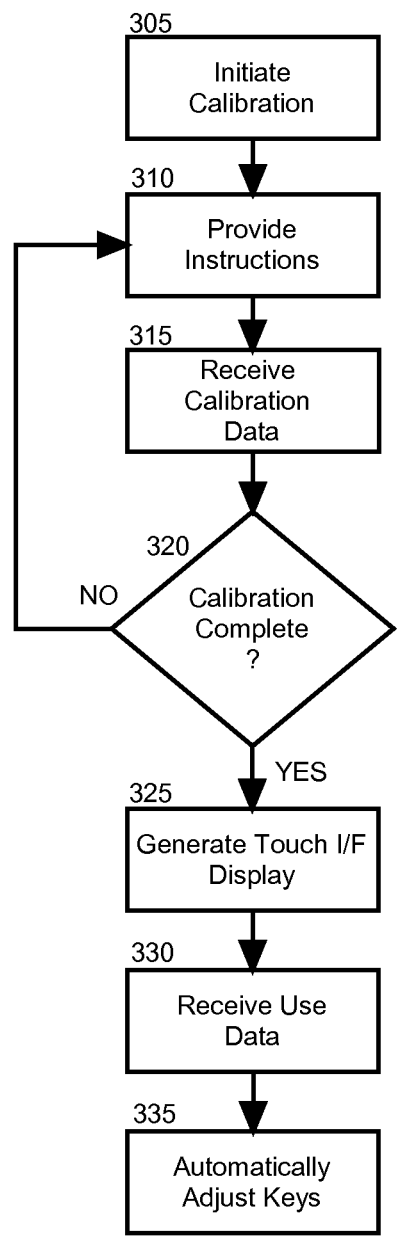

In further illustration, FIG. 3 is a flow chart illustrating a process for generating a touch interface display. In one embodiment of the invention, a method for generating a touch interface display includes in block 305, initiating a set of calibration exercises. In embodiments, the calibration exercises can be based on a starting template—such as a qwerty keyboard or 3×3×3 dialpad. In other embodiments, the calibration exercises can be based on a user defined template, e.g, when a user defines his own display template without any particular start display. In block 310, a set of instructions can be provided to a user of the communication device 100. For example, the set of instructions can be provided audibly to the user by microphone/speaker 220. In block 315, touch interface controller 140 can receive calibration data at the touch interface 110, and then analyze the received calibration data to determine if the calibration is complete in block 320. The received calibration data can include, but is not limited to, finger skin touch area data, finger size data, finger position data and range of motion. If insufficient calibration data is received, then the providing step of block 310 and the receiving step of block 315 can be repeated as is necessary until there is sufficient calibration data. Once there is sufficient calibration data, in block 325, a touch interface display 110 can be generated based on the received calibration data.

In embodiments, the touch interface controller 140 compares the received calibration data to a data set of averages, which are related to other uses having similar anatomy and ranges of motion to select and display an optimized touch interface display layout to the user. The comparison can be based on the averages of individual layouts presented to other users sharing similar or the same anatomy and range of motion profile. In embodiments, the touch interface controller 140 further can include program code enabled to detect the preceding keys touched and utilize this data to determine the correct key to detect, if the resulting display layout happens to place the two or more keys very close to each other in the resulting keyboard display. The touch interface controller 140 further can include program code enabled to detect a range of discrepancy in the center of the surface area for each key touch in a set of key touches. After calibration of the touch interface in block 330, the touch interface controller 140 further can include program code enabled to receive use data for each key touch of the touch interface, define a set of averages over time for finger skin touch area, finger size data and finger position. In block 335, the touch interface controller 140 can automatically resize, reshape and reposition at least one key of the touch interface display 110 based on the defined set of averages.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A computer-implemented method for generating a touch interface display, the method comprising:
    at a communication device with a touch interface,
    initiating a set of calibration exercises;
    providing a set of instructions to a user of the communication device;
    receiving calibration data at the touch interface;
    analyzing the received calibration data to determine if the calibration is complete;
    repeating said providing and receiving steps until the calibration is complete;
    generating a touch interface display based on the received calibration data;
    receiving use data for each key touch of the touch interface;
    defining a set of averages over time for finger skin touch area, finger size data and finger position; and,
    automatically resizing, reshaping and repositioning at least one key of the touch interface display based on the defined set of averages.

2. The method of claim 1, wherein the receiving calibration data at the touch interface comprises receiving finger skin touch area data and finger size data.

3. The method of claim 1, wherein the initiating a set of calibration exercises comprises providing a blank visual keyboard at the touch interface.

4. The method of claim 1, wherein the initiating a set of calibration exercises comprises providing a visual keyboard with a row at the touch interface.

5. The method of claim 1, wherein the generating a touch interface display based on the received calibration data comprises detecting a range of discrepancy in the center of the surface area for each key touch in a set of key touches.

6. The method of claim 1, wherein the generating a touch interface display based on the received calibration data comprises:
    creating an anatomic profile of a user from the received calibration data, the anatomic profile including finger size and range of motion information,
    comparing the anatomic profile of the user to a group average anatomic profile of other users having a similar individual anatomic profile; and,
    providing a starting template for an interface layout based on the comparison of the anatomic profile of the user to the group average anatomic profile of the other users having a similar individual anatomic profile.

7. A communication device with a touch interface, the communication device comprising:
    a microprocessor;
    a touch interface display communicatively coupled to the microprocessor; and
    a touch interface controller configured to control the touch interface display, the touch interface controller comprising program code enabled to receive calibration data at the touch interface, to analyze the received calibration data to determine if the calibration is complete, to generate a touch interface display based on the received calibration data, to receive use data for each key tough of the touch interface, to define a set of averages over time for finger skin touch area, finger size data and finger position and to automatically resize, reshape and reposition at least one key of the touch interface display based on the defined set of averages.

8. The communication device of claim 7, wherein the touch interface controller further comprises program code enabled to:
    create an anatomic profile of a user from the received calibration data, the anatomic profile including finger size and range of motion information,
    compare the anatomic profile of the user to a group average anatomic profile of other users having a similar individual anatomic profile; and,
    provide a starting template for an interface layout based on the comparison of the anatomic profile of the user to the group average anatomic profile of the other users having a similar individual anatomic profile.

9. A computer program product comprising a computer usable storage medium having stored therein computer usable program code for generating a touch interface display, the computer program product including:
    computer usable program code for initiating a set of calibration exercises;
    computer usable program code for providing a set of instructions to a user of the communication device;
    computer usable program code for receiving calibration data at the touch interface;
    computer usable program code for analyzing the received calibration data to determine if the calibration is complete;
    computer usable program code for repeating said providing and receiving steps until the calibration is complete;
    computer usable program code for generating a touch interface display based on the received calibration data;
    computer usable program code for receiving use data for each key touch of the touch interface;
    computer usable program code for defining a set of averages over time for finger skin touch area, finger size data and finger position; and,
    computer usable program code for automatically resizing, reshaping and repositioning at least one key of the touch interface display based on the defined set of averages.

10. The computer program product of claim 9, wherein the computer usable program code for receiving calibration data at the touch interface comprises receiving finger skin touch area data and finger size data.

11. The computer program product of claim 9, wherein the computer usable program code for initiating a set of calibration exercises comprises providing a blank visual keyboard at the touch interface.

12. The computer program product of claim 9, wherein the computer usable program code for initiating a set of calibration exercises comprises providing a visual keyboard with a row at the touch interface.

13. The computer program product of claim 9, wherein the computer usable program code for generating a touch interface display based on the received calibration data comprises detecting a range of discrepancy in the center of the surface area for each key touch in a set of key touches.

14. The computer program product of claim 9, wherein the computer usable program code for generating a touch interface display based on the received calibration data comprises:
   creating an anatomic profile of a user from the received calibration data, the anatomic profile including finger size and range of motion information,
   comparing the anatomic profile of the user to a group average anatomic profile of other users having a similar individual anatomic profile; and,
   providing a starting template for an interface layout based on the comparison of the anatomic profile of the user to the group average anatomic profile of the other users having a similar individual anatomic profile.

* * * * *